(12) United States Patent
Hong

(10) Patent No.: US 6,770,990 B2
(45) Date of Patent: Aug. 3, 2004

(54) RECIPROCATING MOTOR

(75) Inventor: Eon Pyo Hong, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 10/224,389

(22) Filed: Aug. 21, 2002

(65) Prior Publication Data

US 2003/0080633 A1 May 1, 2003

(30) Foreign Application Priority Data

Oct. 30, 2001 (JP) .......................................... 2001-67222

(51) Int. Cl.$^7$ ............................. H02K 1/06; H02K 1/12; H02K 33/00
(52) U.S. Cl. ............................. 310/15; 310/34; 29/596
(58) Field of Search ............................. 310/15, 17, 30, 310/31, 34, 216–218; 29/596

(56) References Cited

U.S. PATENT DOCUMENTS 3,983,435 A * 9/1976 Sims ........................... 310/259
6,013,959 A * 1/2000 Hoppie ........................ 310/12
6,238,192 B1 * 5/2001 Lee ............................. 417/417

* cited by examiner

Primary Examiner—Thanh Lam
Assistant Examiner—Judson H. Jones
(74) Attorney, Agent, or Firm—Birch, Stewart, Kolasch & Birch, LLP

(57) ABSTRACT

In order to provide a reciprocating motor which is able to ensure and to be compacted since an outer stator or an inner stator are laminated as a ring type, and fabrication processes thereof are simple and fabrication cost can be reduced, there is provided a reciprocating motor comprising an outer stator in which winding coil is wound; an inner stator disposed on an inner circumferential surface of the outer stator with a predetermined air gap therebetween; and a magnet disposed between the outer stator and the inner stator to perform linear reciprocating movements and fixed on a magnet paddle, wherein the inner stator are formed by laminating a lamination having a predetermined thickness as a ring shape.

14 Claims, 5 Drawing Sheets

RECIPROCATING MOTOR

BACKGROUND OF THE INVENTION

1. Field of the Invention

The present invention relates to a reciprocating motor, and particularly, to a reciprocating motor which is able to ensure enough magnetic path area, and to reduce a size thereof.

2. Description of the Background Art

Generally, a reciprocating motor is a motor, in which an outer stator and an inner stator are disposed with a predetermined interval therebetween, a magnet paddle including a magnet is disposed between the outer stator and the inner stator, and the magnet paddle is linearly reciprocated by an interaction between the stator and the magnet. In addition, the reciprocating motor is mainly used for a reciprocating compressor, and the magnet paddle of the reciprocating motor is connected to a piston of a reciprocating compressor to make the piston perform linear reciprocating movements.

FIG. 1 is a half cross-sectional view showing a reciprocating motor according to the conventional art, and FIG. 2 is a side view showing an inner stator of the reciprocating motor according to the conventional art.

The conventional reciprocating motor comprises a stator assembly 102 supported by a frame (not shown) for generating a flux by being applied electric power, and a magnet paddle assembly 104 disposed with a predetermined air gap with the stator assembly and performing reciprocating movements by an interaction with the flux generated from the stator assembly 102.

Herein, the stator assembly 102 comprises: an outer stator 106 of cylindrical shape in which a plurality of thin laminations are laminated in radial direction; an inner stator 108 of cylindrical shape, in which a plurality of thin laminations are laminated in radial direction, disposed with a predetermined air gap from an inner circumferential surface of the outer stator 106; and a winding coil 110 wound on inner part of the outer stator 106 for generating flux between the outer stator 106 and the inner stator 108 when the electric power is applied from outer side.

The outer stator 106 is formed as a cylinder by laminating a plurality of thin laminations of plate shapes in radial direction, includes the winding coil 110 wound on the inner circumferential surface thereof, and includes supporting rings 114 inserted into both side surfaces so that the laminated laminations can maintain cylindrical shape.

In addition, as shown in FIG. 2, the inner stator 108 is formed as cylindrical shape by laminating a plurality of laminations 112 in radial direction, and includes supporting ring 116 for supporting the plurality of laminations inserted into both side surfaces.

The outer stator 106 and the inner stator 108 are formed by laminating plan laminations in radial direction, and therefore, the laminations become apart as going outward and predetermined air gaps are formed between the laminations 112.

The magnet paddle assembly 104 comprises a plurality of magnets 120 which are arranged in circumferential direction between the outer stator 106 and the inner stator 108, and a magnet paddle 122 on which the plurality of magnets are fixed on outer circumferential surface thereof with same intervals therebetween, connected to an operational unit (not shown) which is wanted to reciprocally move.

Operations of the conventional reciprocating motor constructed as above will be described as follows.

When the electric power is applied to the winding coil 110, the flux is formed around the winding coil 110, and the flux forms a closed loop along with the outer stator 106 and the inner stator 108. And the magnet 120 is linearly moved toward the axial direction by the interaction between the flux generated between the outer stator 106 and the inner stator 108 and the flux generated by the magnet 120. In addition, when the direction of electric power which is applied to the winding coil 110 is changed alternatively, the direction of flux on the winding coil 110 is also changed and the magnet 120 undergoes linearly reciprocating movements.

According to the movements of the magnet 120, the magnet paddle 122 on which the magnet is fixed performs the linearly reciprocating movements to make the operational unit such as the piston perform the linear reciprocating movements.

However, according to the reciprocating motor of the conventional art, since the outer stator 106 and the inner stator 108 are formed as cylindrical shape by laminating a plurality of laminations 112 of plane plate shapes in radial direction, air gaps between end portions of the laminations 112 are necessarily generated, and enough magnetic path area should be ensured in order to prevent electromagnetic saturation of the motor due to the air gap from being generated.

As described above, in the reciprocating motor according to the conventional art, the sizes of the outer stator 108 and the inner stator 106 should be increased in order to ensure enough magnetic path area, and therefore, the size of the motor is increased and the fabrication cost is also increased.

SUMMARY OF THE INVENTION

Therefore, an object of the present invention is to provide a reciprocating motor which is able to ensure and to be compacted since an outer stator or an inner stator are laminated as a ring type, and fabrication processes thereof are simple and fabrication cost can be reduced.

To achieve the object of the present invention, as embodied and broadly described herein, there is provided a reciprocating motor comprising: an outer stator in which winding coil is wound; an inner stator disposed on an inner circumferential surface of the outer stator with a predetermined air gap therebetween; and a magnet disposed between the outer stator and the inner stator to perform linear reciprocating movements and fixed on a magnet paddle, and the outer stator and the inner stator are formed by laminating a lamination having a predetermined thickness as a ring shape.

The inner stator or the outer stator is formed as a ring by repeating processes of winding a lamination having a predetermined thickness less than 360° and winding the steel plate toward opposite direction, and includes an opening on one side.

In the inner stator or the outer stator, a virtual line which connects openings which are facing each other is formed to be located on a same circumferential surface so that the inner circumferential surface and the outer circumferential surface thereof make a right circle.

The inner stator or the outer stator is fabricated by repeating processes of winding a lamination on an outer circumferential surface of a cylinder having a predetermined diameter, bending the lamination, and winding toward opposite direction.

The inner stator or the outer stator is fabricated by bending a lamination having a predetermined thickness so as to be laminated straightly as a predetermined length, and winding it to make a cylindrical shape.

Both ends of the lamination of the outer stator or the inner stator are shortened as going toward one surface making an inner circumferential surface of the inner stator when the lamination is bent to be laminated as a straight line form.

The inner stator or the outer stator is fabricated by inserting a plurality of laminations of cylindrical shapes having different diameters from those of each other layer by layer.

The lamination of the inner stator or of the outer stator is formed to have an opened end on one side, and both opened ends of the laminations are formed to be located on a same straight line.

Contacting surfaces of laminations of the inner stator or of the outer stator are fixed by applying adhesive.

Contacting surfaces of laminations of the inner stator or of the outer stator are fixed by welding.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENTS

Reference will now be made in detail to the preferred embodiments of the present invention, examples of which are illustrated in the accompanying drawings.

There may be a plurality of embodiments for a reciprocating motor according to the present invention, however, the most preferred embodiments will be described.

Figure 1:
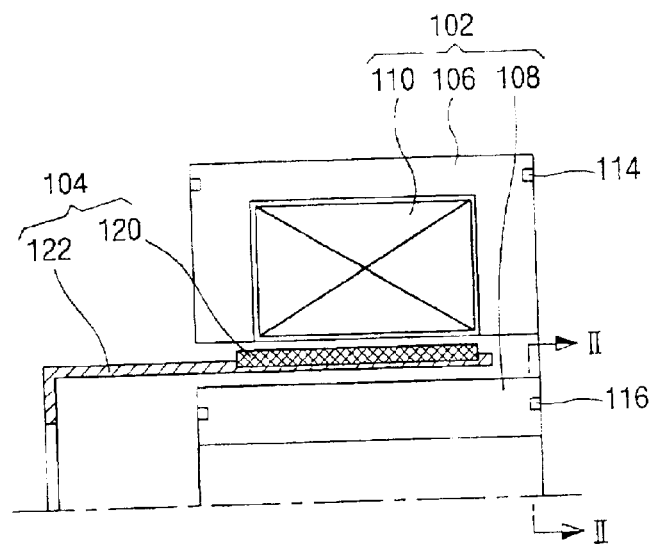
FIG. 1 is a half cross-sectional view showing a reciprocating motor according to the conventional art.
Figure 2:
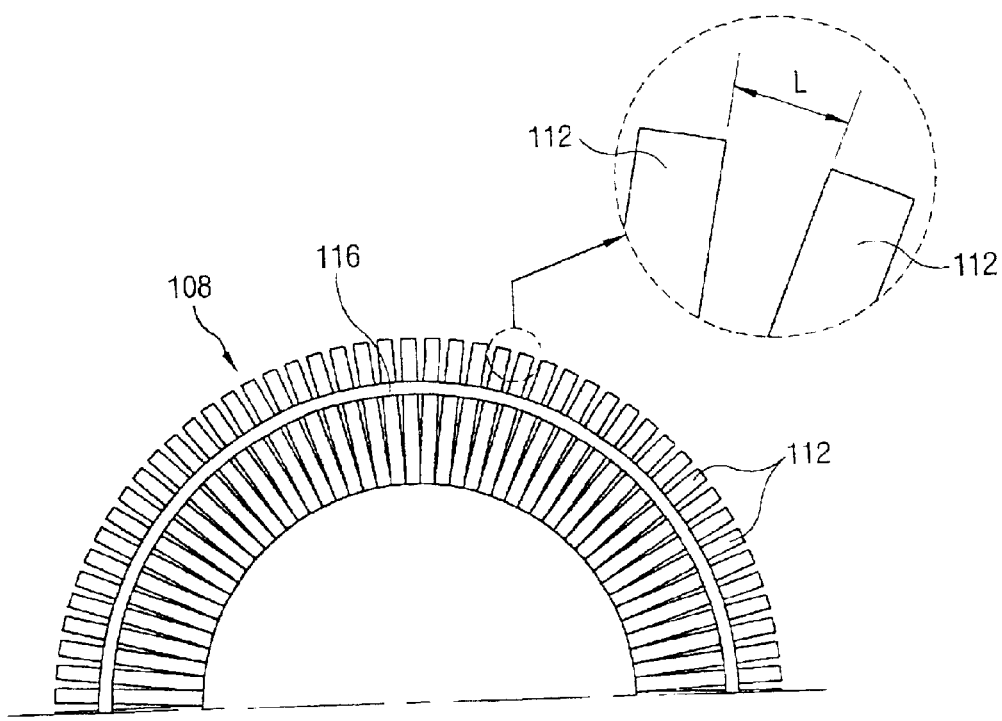
FIG. 2 is a side view showing an inner stator in the reciprocating motor according to the conventional art.
Figure 3:
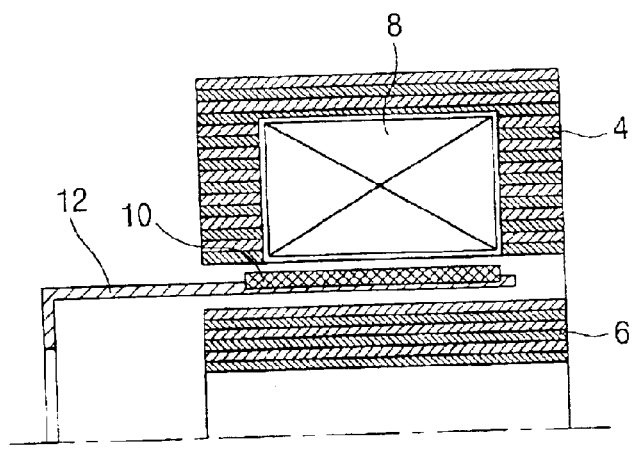
FIG. 3 is a half cross-sectional view showing a reciprocating motor according to the present invention.

FIG. 3 is a cross-sectional view showing the reciprocating motor according to the present invention.

The reciprocating motor according to the present invention comprises: an outer stator 4 supported by a supporting frame (not shown); an inner stator 6 disposed on an inner circumferential surface of the outer stator 4 with a predetermined air gap therebetween for generating a flux with the outer stator 4; a winding coil 8 wound on one of the outer stator 4 or the inner stator 6; a magnet 10 disposed between the outer stator 4 and the inner stator 6 to be moved linearly; and a magnet paddle 12 connected between the magnet 10 and an operational unit (not shown), which is wanted to be moved, for transmitting reciprocating movements of the magnet 10 to the operational unit.

Herein, as an example of the operational unit, there is a piston which is linearly reciprocated for compression in case that the reciprocating motor is applied to a reciprocating compressor.

The outer stator 4 and the inner stator 6 may be formed to have same structures, or the outer stator may be formed to have same structure as that of the conventional art and the inner stator 6 may be formed as the structure suggested by the present invention according to circumstances.

Hereinafter, since the outer stator 4 and the inner stator 6 are formed to have same structure as each other, the structure and fabrication method of the inner stator 6 will be described in the present embodiment.

Figure 4:
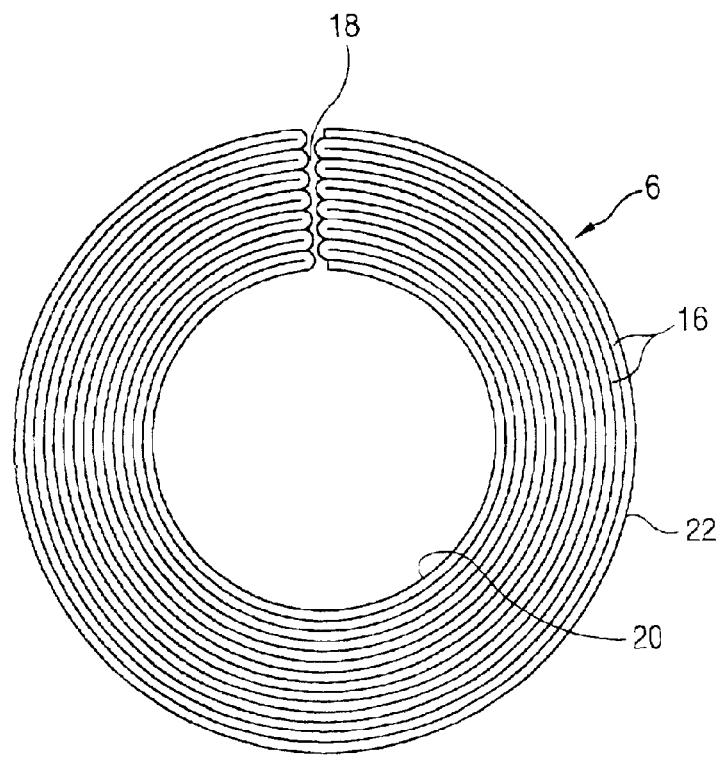
FIG. 4 is a side view showing an inner stator in the reciprocating motor according to the present invention.

FIG. 4 is a side view showing the inner stator 6 of the reciprocating motor according to the present invention.

The inner stator 6 is formed as a cylinder by laminating a lamination 16 having a predetermined thickness in circumferential direction. That is, the lamination 16 is a plane plate having a predetermined length, bent after being wound forward centering around a certain point, and bent after being wound toward reverse direction. And the above processes are repeated to form a cylinder shape having desired thickness.

At that time, the inner stator 6 is formed as a cylinder laminated in circumferential direction since the lamination 16 is wound repeatedly forward and backward, and an opening 18 is formed on bent points.

Herein, in the inner stator, since one lamination is repeatedly bent forward and backward, the bent parts which are facing each other are located on same circumferential surface, and the inner circumferential surface 20 and the outer circumferential surface 22 of the inner stator 6 are formed as right circles.

Figure 5:
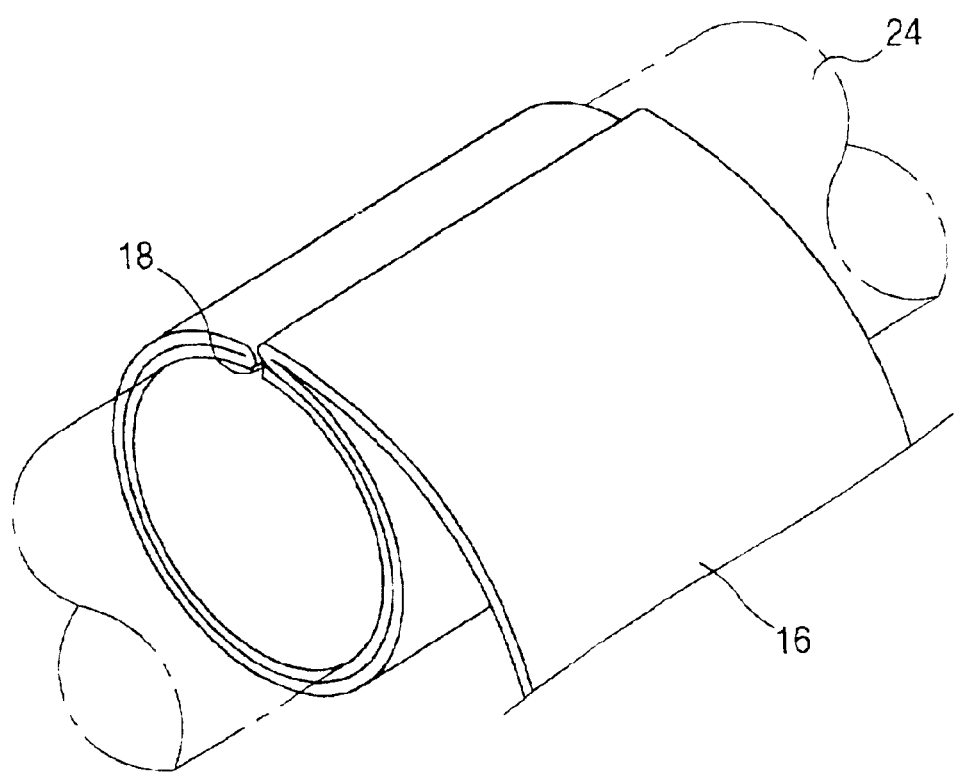
FIG. 5 is a perspective view showing an embodiment of fabricating method for the inner stator in the reciprocating motor according to the present invention.

FIG. 5 is a perspective view showing a fabricating method for the inner stator according to the present invention.

The lamination 16 is wound on an outer circumferential surface of a cylinder body 24 having a predetermined diameter forward as 360° centering around the opening 18, bent backward and wound to be 360°, and then bent again forward and wound as 360° to fabricate the inner stator 6 of cylindrical shape having a predetermined thickness. At that time, the diameter of the cylinder body 24 is formed to be same as the inner diameter of the inner stator which will be fabricated.

Figure 6:
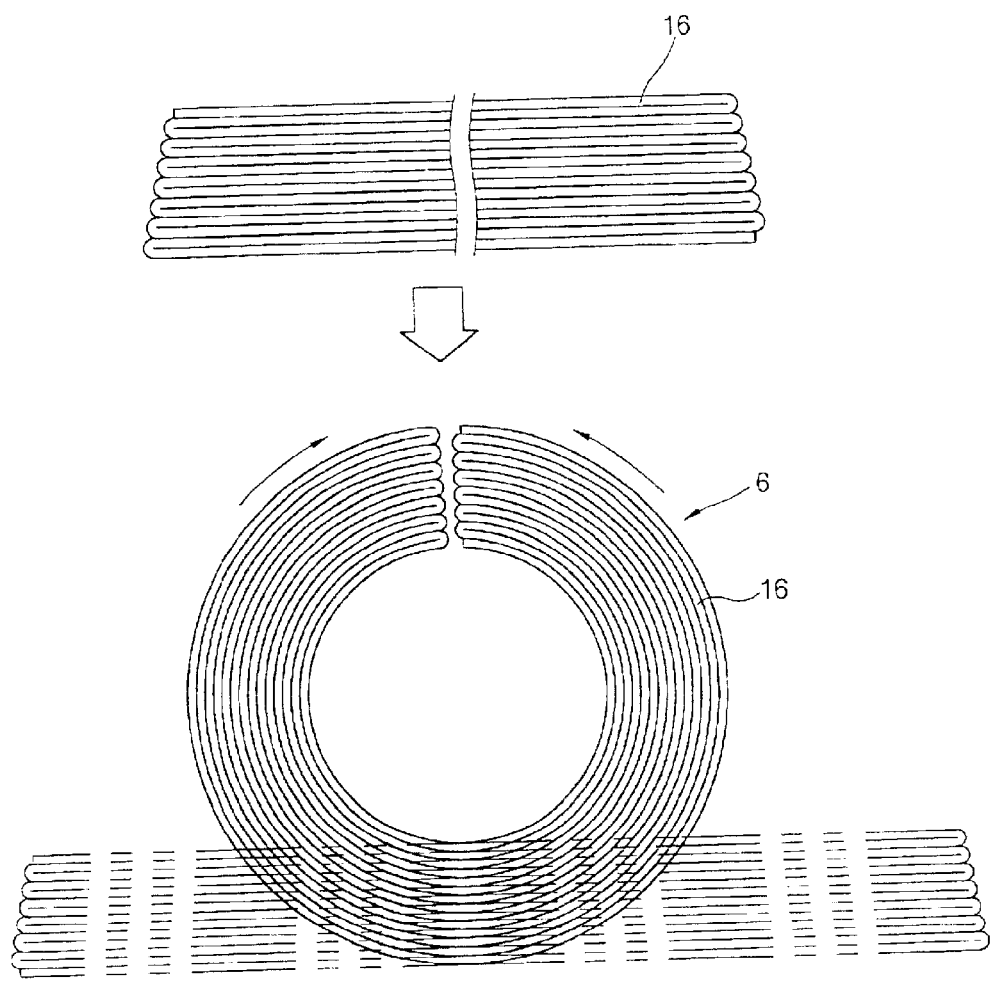
FIG. 6 is a perspective view showing another embodiment of fabricating method for the inner stator in the reciprocating motor according to the present invention.

FIG. 6 is a processing flow chart showing the fabricating method for the inner stator according to a second embodiment of the present invention.

First of all, the lamination 16 of plane plate having a predetermined thickness is laminated to be a predetermined thickness on a plane. That is, the lamination is laminated to one direction, bent on end portion, and laminated to opposite direction. In addition, the upper surface is formed to have same length as that of desired inner diameter, and both end portions, which are bent, are shortened as going to upper part, that is, the laminated body is formed as a trapezoid shape. In addition, when the laminated body of lamination is formed as a cylinder by compressing on both end portions, then the inner stator 6 in which both end portions are facing each other is completed.

As described above, since the laminated body is formed as a trapezoid when the lamination 16 is laminated straightly, the both end surfaces facing each other are formed as straight lines when the laminated body is transformed to cylindrical shape.

Figure 7:
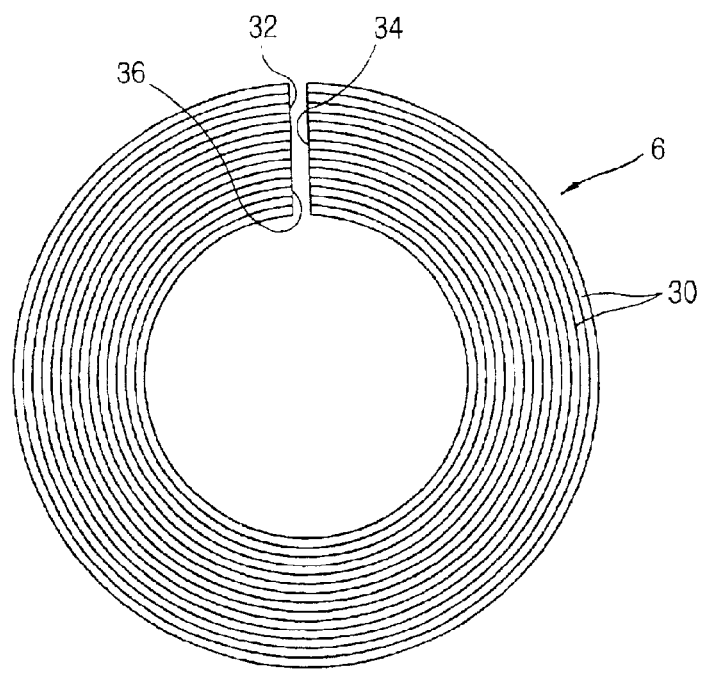
FIG. 7 is a side view showing another embodiment of the inner stator in the reciprocating motor according to the present invention.
Figure 8:
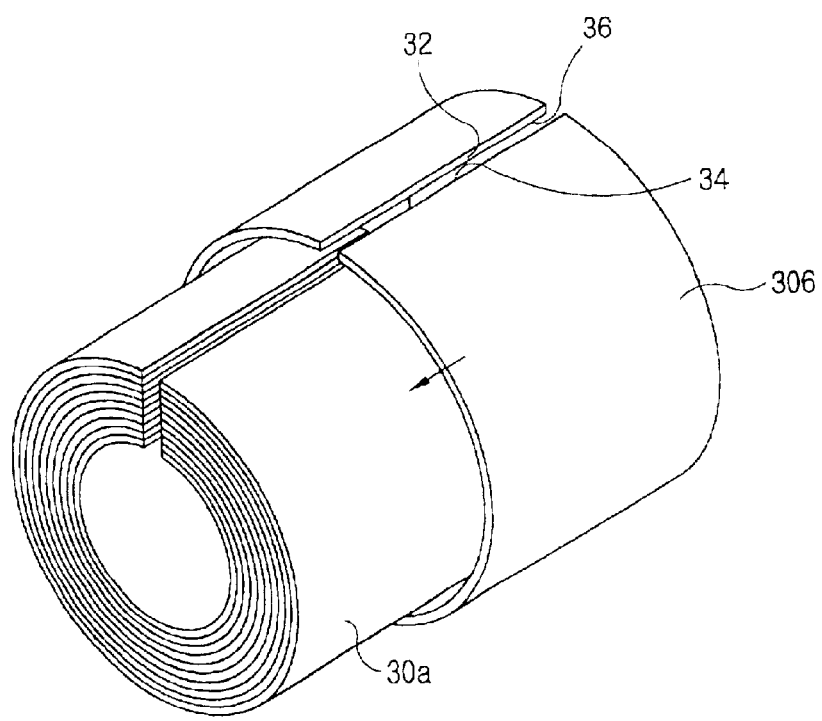
FIG. 8 is a perspective view showing a fabricating method for the inner stator of the reciprocating motor according to the another embodiment of the present invention.

FIG. 7 is a side view showing an inner stator of reciprocating motor according to a third embodiment of the present invention, and FIG. 8 is a perspective view showing a fabricating method for the inner stator of the reciprocating motor according to the third embodiment of the present invention.

The inner stator 6 according to the third embodiment is formed as a cylinder with an opening by inserting a plurality of laminations 30 having different diameters from each other.

That is, as shown in FIG. 8, a plurality of laminations of cylindrical shape with an opening on one side are formed to have different diameters respectively, and then a lamination 30a having shorter diameter is inserted into an inner circumferential surface of a lamination having longer diameter. At that time, both end portions 32 and 34 constructing the opening 36 of respective lamination 30 are arranged to be located on a same straight line.

Herein, adjacent laminations 30a and 30b are fixed by applying adhesive, or by welding.

Operations of the reciprocating motor constructed as above will be described as follows.

When the electric power is applied to the winding coil 8, a flux is generated around the winding coil 8. In addition, the flux generated a closed loop along with the outer stator 4 and the inner stator 6, and the magnet 10 is linearly moved toward axial direction by an interaction between the flux generated between the outer stator 4 and the inner stator 6 and the flux generated by the magnet 10.

In addition, when direction of the electric power applied to the winding coil 8 is changed alternatively, the direction of the flux on the winding coil 8 is also changed and the magnet 10 performs linear reciprocating movements. Then, the magnet paddle 12 on which the magnet 10 is fixed performs the linear reciprocating movements to make the operational unit such as the piston perform the linear reciprocating movements.

Effects of the reciprocating motor according to the present invention will be described as follows.

The outer stator or the inner stator of the reciprocating motor according to the present invention is formed as a cylinder having a predetermined thickness by laminating the lamination in circumferential direction, and therefore, air gap between the laminations can be removed to ensure enough magnetic path area. Also, the size can be reduced, and the function of the motor can be improved and the size of the motor can be reduced.

Also, one lamination is wound forward and backward repeatedly to fabricate the inner stator and the outer stator having a predetermined thickness, and therefore, the fabrication processes can be simplified and the fabrication cost can be reduced.

Also, when the laminations having different diameters are inserted to assemble the inner stator and the outer stator, the fabrication processes can be also simplified and the fabrication cost can be reduced.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

What is claimed is:

1. A reciprocating motor comprising:
   an outer stator in which a winding coil is wound;
   an inner stator disposed on an inner circumferential surface of the outer stator with a predetermined air gap therebetween; and
   a magnet disposed between the outer stator and the inner stator to perform linear reciprocating movements and fixed on a magnet paddle,
   wherein the inner stator is formed by repeatedly winding a lamination in first direction and then in an opposite direction.

2. The motor of claim 1, wherein the inner stator is fabricated by repeating processes of winding a lamination on an outer circumferential surface of a cylinder having a predetermined diameter, bending the lamination, and winding the lamination toward opposite direction.

3. The motor of claim 1, wherein the inner stator is fabricated by bending the lamination to thereby form layers, and then winding the lamination to make a cylindrical shape.

4. The motor of claim 1, wherein the inner stator is fabricated by inserting a plurality of laminations of cylindrical shapes having different diameters from those of each other layer by layer.

5. The motor of claim 4, wherein the lamination has an opened end, and wherein the opened end is formed to be located on a straight line.

6. The motor of claim 4, wherein contacting surfaces of the laminations are fixed by applying adhesive.

7. The motor of claim 4, wherein contacting surfaces of the laminations are fixed by welding.

8. A reciprocating motor comprising:
   an outer stator in which a winding coil is wound;
   an inner stator disposed on an inner circumferential surface of the outer stator with a predetermined air gap therebetween; and
   a magnet disposed between the outer stator and the inner stator to perform linear reciprocating movements and fixed on a magnet paddle,
   wherein the outer stator is formed by repeatedly winding a lamination in first direction and then in an opposite direction.

9. The motor of claim 8, wherein the outer stator is fabricated by repeating processes of winding a lamination on an outer circumferential surface of a cylinder having a predetermined diameter, bending the lamination, and winding the lamination toward opposite direction.

10. The motor of claim 8, wherein the outer stator is fabricated by bending a lamination to thereby form layers, and then winding the lamination to make a cylindrical shape.

11. The motor of claim 8, wherein the outer stator is fabricated by inserting a plurality of laminations of cylindrical shapes having different diameters from those of each other layer by layer.

12. The motor of claim 11, wherein the lamination has an opened end, and wherein the opened end in is formed to be located on a straight line.

13. The motor of claim 11, wherein contacting surfaces of the laminations are fixed by applying adhesive.

14. The motor of claim 11, wherein contacting surfaces of the laminations are fixed by welding.

* * * * *